United States Patent
Holman

(10) Patent No.: US 11,073,909 B2
(45) Date of Patent: Jul. 27, 2021

(54) INTERIOR SENSING

(71) Applicant: Facebook Technologies, LLC, Menlo Park, CA (US)

(72) Inventor: David Holman, Toronto (CA)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/383,090

(22) Filed: Apr. 12, 2019

(65) Prior Publication Data

US 2019/0317601 A1 Oct. 17, 2019

Related U.S. Application Data

(60) Provisional application No. 62/657,120, filed on Apr. 13, 2018.

(51) Int. Cl.
*G06F 3/01* (2006.01)
*G06F 3/041* (2006.01)
*G06F 3/044* (2006.01)

(52) U.S. Cl.
CPC ............ *G06F 3/014* (2013.01); *G06F 3/044* (2013.01); *G06F 3/0416* (2013.01); *G06F 2203/04104* (2013.01)

(58) Field of Classification Search
CPC .......... G06F 2203/04104; G06F 3/014; G06F 3/0416; G06F 3/044
See application file for complete search history.

(56) References Cited

U.S. PATENT DOCUMENTS

| | | | | |
|---|---|---|---|---|
| 2004/0243342 A1* | 12/2004 | Rekimoto | ............... | G06F 3/011 |
| | | | | 702/150 |
| 2013/0275082 A1* | 10/2013 | Follmer | ................. | G06F 3/016 |
| | | | | 702/155 |
| 2014/0015768 A1* | 1/2014 | Karpin | ................. | G06F 3/0418 |
| | | | | 345/173 |
| 2015/0091842 A1* | 4/2015 | Shepelev | ............ | G06F 3/04184 |
| | | | | 345/174 |
| 2015/0123682 A1* | 5/2015 | Burger | ..................... | G01D 5/24 |
| | | | | 324/688 |
| 2016/0246393 A1* | 8/2016 | Lee | .......................... | G06F 3/041 |
| 2017/0235370 A1* | 8/2017 | Chen | ................... | G06F 3/04166 |
| | | | | 345/174 |
| 2018/0360379 A1* | 12/2018 | Harrison | ................ | A61B 5/681 |
| 2019/0033974 A1* | 1/2019 | Mu | ......................... | G06F 3/017 |
| 2019/0187854 A1* | 6/2019 | Hosur | ................... | G06F 3/0412 |

FOREIGN PATENT DOCUMENTS

WO   WO-2017171218 A1 * 10/2017 ........... G06F 3/0448

* cited by examiner

*Primary Examiner* — Hong Zhou
(74) *Attorney, Agent, or Firm* — FisherBroyles, LLP

(57) ABSTRACT

A controller for sensing interior motion includes a sensor structure having transmitting conductors and receiving conductors. The controller comprises circuitry to drive and sense signals on interacting pairs of conductors (the transmitting conductor or receiving conductor can act as the drive side, or as the sense side). Signals are processed to analyze changes in measured signal and analyzed to determine interior movement. When the controller is deployed proximate to human skin, movement of muscles, tendons and bones within the skin are reflected in the measured signals.

20 Claims, 11 Drawing Sheets

INTERIOR SENSING

This application claims the benefit of U.S. Provisional Application Ser. No. 62/657,120, filed Apr. 13, 2018, the contents of which are hereby incorporated by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed apparatus and methods relate in general to the field of sensors, and in particular to sensors that are able to detect motion occurring within an interior space.

BACKGROUND

In recent years virtual reality (VR) and augmented reality (AR) have become increasingly popular as computational power and immersive possibilities have become more common. Generally, while systems and methods offer ways to interact with VR and AR environments, frequently the mechanisms for interacting with these types of environments detracts from the immersive nature intended to be obtained by these technologies.

What is needed are sensors that provide detailed information relative to position, movement or interaction, without detracting from the immersiveness of the overall system.

BRIEF DESCRIPTION OF THE DRAWINGS

The foregoing and other objects, features, and advantages of the disclosure will be apparent from the following more particular description of embodiments as illustrated in the accompanying drawings in which reference characters refer to the same parts throughout the various views. The drawings are not necessarily to scale, emphasis instead being placed upon illustrating principles of the disclosed embodiments.

DETAILED DESCRIPTION

Figure 1:
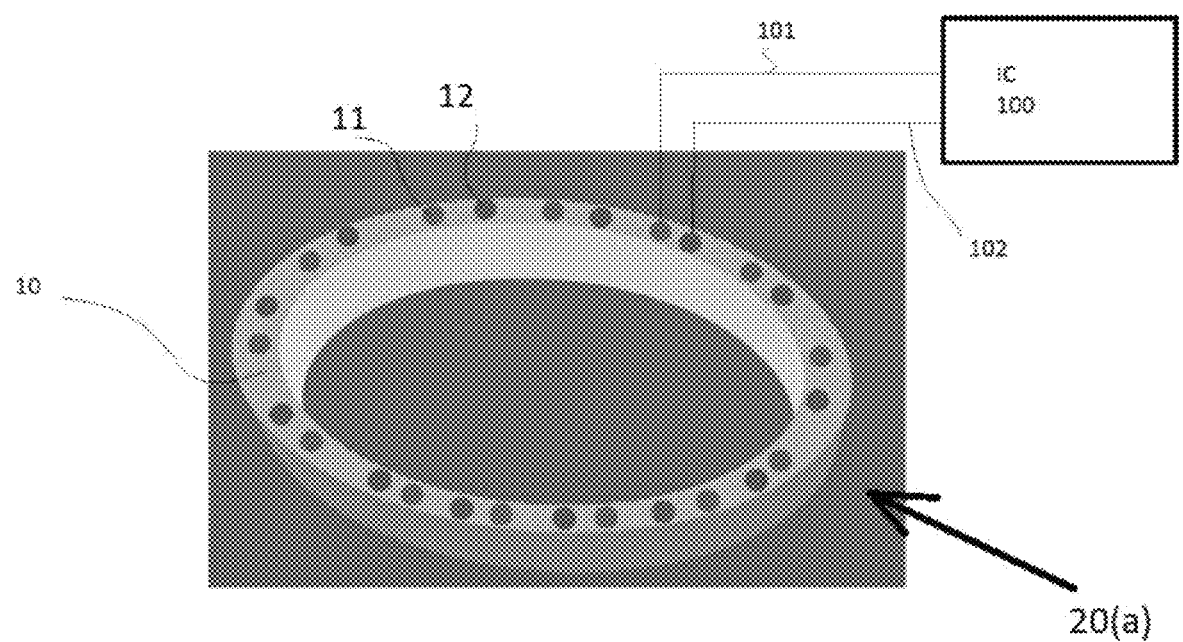
FIG. 1 shows a schematic view of a controller for detecting interior motion

The following description relates to sensors that have the ability to determine interior motion. By "interior motion" it is generally meant motion that is occurring within a volume of space behind or within a layer or layers of material, such as plastic, skin, fabric, etc. Interior motion may also reflect the movement of an object within a volume of space bordered by conductors/antennas. The volume of space may be filled with a fluid or other medium through which an object or objects moves. The motion of or detection of movement within the volume of space is interior motion. For example, if the sensor is a bracelet located on a wrist, the interior motion sensed would be the movement of bones, muscles, tendons and ligaments located within the volume space formed by the skin of the wrist (i.e. the layer). In an embodiment, the interior motion is sensed by measuring and determining information from the signals transmitted by and received by various conductors/antennas.

In an embodiment, one or more conductors (also referred to herein as antennas) are embedded within a structure or device and the one or more conductors detect information concerning the interior movement. The interior information is determined from analysis of signals received. In an embodiment, one or more conductors are embedded within a wearable sensor that detects information concerning pose as a result of analysis of received signals regarding the interior motion. In an embodiment, interior motion is inferred based on the change in the electrical relationship between more than one conductor. In an embodiment, at least one conductor is used to transmit an electrical signal and another conductor is used to receive that signal, and interior motion is inferred based on changes in the received signal.

This application relates to user interfaces such as found in U.S. Provisional application Ser. No. 16/251,975, entitled "Matrix Sensor with Receive Isolation." The entire disclosure of that application, and the applications incorporated therein by reference, are incorporated herein by reference. The presently disclosed systems and methods provide for designing and manufacturing sensors that employ a multiplexing scheme based on orthogonal signaling such as but not limited to frequency-division multiplexing (FDM), code-division multiplexing (CDM), or hybrid modulation techniques that can combine multiple schemes such as FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensors. These applications contemplate FDM, CDM, or hybrid sensors which employ principles which may be used in connection with the presently disclosed sensors.

This application also employs principles used in fast multi-touch sensors and other interfaces disclosed in the following: U.S. Pat. Nos. 9,933,880; 9,019,224; 9,811,214; 9,804,721; 9,710,113; and 9,158,411. Familiarity with the disclosure, concepts and nomenclature within these patents is presumed. The entire disclosures of those patents and the applications incorporated therein by reference are incorporated herein by reference. This application also employs principles used in fast multi-touch sensors and other interfaces disclosed in the following: U.S. patent application Ser. Nos. 15/162,240; 15/690,234; 15/195,675; 15/200,642; 15/821,677; 15/904,953; 15/905,465; 15/943,221; 62/540, 458, 62/575,005, 62/621,117, 62/619,656 and PCT publication PCT/US2017/050547, familiarity with the disclosures, concepts and nomenclature therein is presumed. The entire disclosure of those applications and the applications incorporated therein by reference are incorporated herein by reference.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency orthogonal to each other, in which case, they could not be the same frequency.

Certain principles of a fast multi-touch (FMT) sensor have been disclosed in the patent applications discussed above. Orthogonal signals are transmitted into a plurality of transmitting conductors (or antennas) and the information received by receivers attached to a plurality of receiving conductors (or antennas), the signal is then analyzed by a signal processor to identify events. The transmitting conductors and receiving conductors may be organized in a variety of configurations, including, e.g., a matrix where the crossing points form nodes, and interactions are detected at those nodes by processing of the received signals. In an embodiment where the orthogonal signals are frequency orthogonal, spacing between the orthogonal frequencies, $\Delta f$, is at least the reciprocal of the measurement period $\tau$, the measurement period T being equal to the period during which the columns are sampled. Thus, in an embodiment, a column or antenna may be measured for one millisecond ($\tau$) using frequency spacing ($\Delta f$) of one kilohertz (i.e., $\Delta f=1/\tau$).

In an embodiment, the signal processor of a mixed signal integrated circuit (or a downstream component or software) is adapted to determine at least one value representing each frequency orthogonal signal transmitted to a row. In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., windows) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that the term orthogonal as used herein is not "violated" by such small contributions. In other words, as we use the term frequency orthogonal herein, two signals are considered frequency orthogonal if substantially all of the contribution of one signal to the DFT bins is made to different DFT bins than substantially all of the contribution of the other signal.

In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at 4 MHz would yield an integration period slightly longer than a millisecond, and not achieve 1 kHz sampling, and a minimum frequency spacing of 976.5625 Hz.) In an embodiment, the frequency spacing is equal to the reciprocal of the integration period. In such an embodiment, the maximum frequency of a frequency orthogonal signal range should be less than 2 MHz. In such an embodiment, the practical maximum frequency of a frequency orthogonal signal range is preferably less than about 40% of the sampling rate, or about 1.6 MHz. In an embodiment, a DFT (which could be an FFT) is used to transform the digitized received signals into bins of information, each reflecting the frequency of a frequency orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decreased, the integration period may be adjusted, the frequency range may be adjusted, etc.

In an embodiment, a DFT (which can be an FFT) output comprises a bin for each frequency orthogonal signal that is transmitted. In an embodiment, each DFT (which can be an FFT) bin comprises an in-phase (I) and quadrature (Q) component. In an embodiment, the sum of the squares of the I and Q components is used as measure corresponding to signal strength for that bin. In an embodiment, the square root of the sum of the squares of the I and Q components is used as measure corresponding to signal strength for that bin. It will be apparent to a person of skill in the art in view of this disclosure that a measure corresponding to the signal strength for a bin could be used as a measure related to activity, touch events, etc. In other words, the measure corresponding to signal strength in a given bin would change as a result of some activity proximate to the sensors, such as a touch event.

In various embodiments discussed below, the disclosure is directed to motion sensing controllers, and methods for designing, manufacturing and operating motion sensing controllers (e.g., hand movement controllers), and in particular controllers using signals to determine an amount of interior motion to model a body part. Throughout this disclosure, various controller shapes and patterns are used for illustrative purposes. Although example compositions and/or geometries are disclosed for the purpose of illustrating the invention, other compositions and geometries will be apparent to a person of skill in the art, in view of this disclosure, without departing from the scope and spirit of the disclosure herein.

Generally, the sensing methods described herein sense interaction between pairs of conductors (also referred to as antennas), where at least one is used for transmitting a signal, and at least one is used for receiving a signal. In an embodiment, either of the pair (each of the two conductors) is used for transmitting or receiving. In an embodiment, both conductors are used for both transmitting and receiving. In an embodiment, each of the two conductors are used for both transmitting and receiving simultaneously. When used for transmitting, the conductor is operatively connected to a signal generator. When used for receiving, the conductor is operatively connected to a signal receiver.

The term antenna is often used interchangeably with the term conductor when referring to the interacting pairs. Specifically, where a signal is transmitted on one conductor/antenna, a field is created between that conductor/antenna and one or more other conductor/antenna (e.g., at least one receiver conductor—but there can be many). The field created can be disturbed by certain kinds of interactions, e.g., the presence of human body parts or other objects. Sensing is accomplished by measuring small changes in the field by the motion of objects within the field. In an embodiment, changes in the magnitude of a signal received at the receiver are measured and used to derive sensing information. In an embodiment, changes in the phase of a signal received at the receiver are measured and used to derive sensing information. In an embodiment, sensing relies on the fusion of multiple measurements (e.g., magnitude and phase), including measurements made by other sensors. It will be apparent to a person of skill in the art in view of this disclosure that although the elements that operatively join the conductors/antennas described herein with the driving or receiving circuitry (e.g., signal generators or signal receivers) may be conductive, and may even be referred to as a conductor, it does not refer to the conductor/antenna for sensing interactions.

Throughout this disclosure, the terms "interior motion", "interior movement", "interior action" or other descriptors may be used to describe events or periods of time during which changes in signals received by a conductor (e.g., antenna) are caused by such movement within a volume of space surrounded by material. Generally, movement within a volume of space bordered by conductors causes changes to a field generated by the transmission and receipt of signals by the conductors. Changes to the field can be measured and are indicative of motion that is occurring within the field. In an embodiment, the changes in the field are used to identify pose, e.g., a body position or hand position. In an embodiment, an "interior motion", "interior movement" or "interior action" may be detected, processed, quantified and/or supplied to downstream computational processes with very low latency, e.g., on the order of ten milliseconds or less, or on the order of less than one millisecond.

The term "controller" as used herein is intended to refer to a physical object that may provide the function of an interface with a computer or computer implemented software. In an embodiment, the controller is a wristband. In an embodiment, the controller is able to detect movements of a hand through interior movements occurring within the wristband. In an embodiment, the controller is able to detect the movements of a hand by sensing such movements directly as well through interior movements. See, e.g., U.S. Provisional Patent Application No. 62/473,908, entitled "Hand Sensing Controller," filed Mar. 20, 2017; U.S. Provisional Patent Application No. 62/488,753, entitled "Heterogenous Sensing Apparatus and Methods" filed on Apr. 22, 2017; and U.S. Provisional Patent Application No. 62/588,267, entitled "Sensing Controller" filed on Nov. 17, 2017; the contents of the aforementioned applications incorporated herein by reference.

In an embodiment, the controller provides position and/or movement of body parts through the detection of interior motion. The interior motion provides information regarding the surface areas proximate to and/or associated with the body part and/or function, e.g., the articulation of the bones, joints and muscles of the wrist area and how it translates into the position and/or movement of the hand; the articulation of the bones, joints and muscles of the ankle area and how it translates into position and/or movement of the foot; the vibration and movement of the vocal cords and how it translates into speech; the detection of a heartbeat; and/or the detection of pulse.

The controller and sensing modality discussed herein focuses on interior motion, however it should be understood that the controller and sensing modality may be used with and/or in addition to other sensing modalities. In an embodiment, the conductors perform more than one type of sensing modality in addition to interior motion sensing. In an embodiment, the relative movement of conductors with respect to each other may be used to determine information in addition to or instead of interior motion. In an embodiment, at least one of the conductors may be a flexible conductor and perform interior motion sensing and deformation sensing. When performing deformation sensing a deformable conductor may be performed, such as set forth in U.S. patent application Ser. No. 15/943,221, the contents of which are hereby incorporated herein by reference. By "deformable" it is meant that the shape of the first or receiving conductor changes, for example, but not limited to, bending, twisting, compressing, expanding, lengthening, shortening, and/or folding. The deformability of at least one of the first and receiving conductors permits movement of the at least one of the first and receiving conductors relative to another of the first and receiving conductors. For example, a transmitting conductor can be deformable and move relative the receiving conductor. The transmitting conductor may be functioning as a transmitter and the receiving conductor may be functioning as a receiver. In this example, the receiving conductor receives signals that can be used to determine the amount of deformation that has occurred. This deformation is then used to extrapolate information regarding the user, for example, hand position, ankle position, chest motion, etc. In an embodiment, the deformable conductor is a conductive magnofluid material, such as ferrofluid, gallium and gallium alloy.

The apparatuses discussed herein, which may be controllers, use transmitting conductors and receiving conductors. The transmitting conductors and receiving conductors can be transmitters, receivers or ground. However, it should be understood that whether the transmitting conductor (or receiving conductor) is a transmitter, a receiver, or ground depends on context and the embodiment. In an embodiment, the transmitters and receivers for all or any combination of patterns are operatively connected to a single integrated circuit (IC) capable of transmitting and receiving the required signals. In an embodiment, the transmitters and receivers are each operatively connected to a different integrated circuit capable of transmitting and receiving the required signals, respectively. In an embodiment, the transmitters and receivers for all or any combination of the patterns may be operatively connected to a group of integrated circuits, each capable of transmitting and receiving the required signals, and together sharing information necessary to such multiple IC configuration. In an embodiment, where the capacity of the integrated circuit (i.e., the number of transmit and receive channels) and the requirements of the patterns (i.e., the number of transmit and receive channels) permit, all of the transmitters and receivers for all of the multiple patterns used by a controller are operated by a common integrated circuit, or by a group of integrated circuits that have communications therebetween. In an embodiment, where the number of transmit or receive channels requires the use of multiple integrated circuits, the information from each circuit is combined in a separate system. In an embodiment, the separate system comprises a Graphics Processing Unit (GPU) and software for signal processing.

Figure 2:
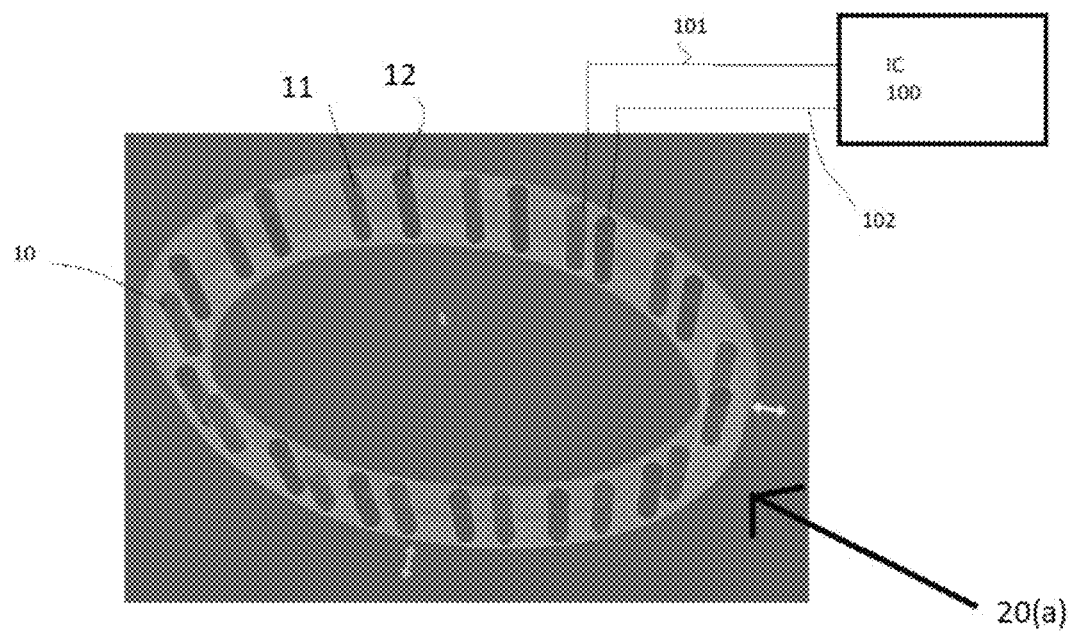
FIG. 2 shows another schematic view of the controller for detecting interior motion that is shown in FIG. 1.

Now turning to the figures, embodiments of controllers implementing interior sensing are disclosed. Turning to FIGS. 1 and 2, shown is an embodiment of a controller 20(a) that is adapted to detect interior motion within the interior of the circle that is shown. FIG. 1 shows an opaque view of the controller 20(a) while FIG. 2 shows a view illustrating the inside of the controller 20(a). Shown in FIGS. 1 and 2 is an exemplary sensor structure 10 comprising a plurality of transmitting conductors 11 and a plurality of receiving conductors 12 located throughout the sensor structure 10. The transmitting conductors 11 and/or receiving conductors 12 are operably connected to integrated circuit 100. transmitting conductors 11 are operably connected to the integrated circuit 100 via lead 101 and receiving conductors 12 are operably connected to the integrated circuit 100 via lead 102. Integrated circuit 100 comprises the drive and sense circuitry. The sensor structure 10, the transmitting conductors 11 and the receiving conductors 12 form part of the controller 20(a). In an embodiment, the controller 20(a) is a device for measuring a function of a body part. In an embodiment, the controller 20(a) is a device for determining position, movement and/or another characteristic of a body part.

In an embodiment, the sensor structure forms a portion of a wearable, such as a wristband, ankle band, arm band, headband, neck gaiter, ring, etc. In an embodiment, sensor structure forms a portion of a wearable, such as pants, shoes, socks, shirts, hats, goggles, gloves, gauntlets, etc. In an embodiment, sensor structure is embodied in a film that is secured on a user. In an embodiment, sensor structure is a portion of a wearable that is secured directly on a user's skin. In an embodiment, sensor structure is a portion of a wearable that may be secured to a user directly on the skin via an adhesive.

In an embodiment, the sensor structure is a portion of an automotive system that can benefit from sensing, e.g., a car seat, steering wheel, console, dashboard, interior door, tire, carpet, etc. In an embodiment, the sensor structure is a portion of a robotic system that requires sensing, e.g., control arm, etc. In an embodiment, the sensor structure is a portion of another system that requires sensing within an interior region and can use the information gained from sensing within the interior region to provide a useable result to the system. For example, a piping system or other system in which activity takes place within an interior volume of a space.

In an embodiment, the sensor structure is made of material that is an elastomeric. In an embodiment, the sensor structure is made of material that is a rubber. In an embodiment, the sensor structure is made of material that comprises silicone. In an embodiment, the sensor structure is made of material that is a fabric. In an embodiment, the sensor structure is made of an elastic material. In an embodiment, the sensor structure is made of a material that has cavities formed therein. In an embodiment, the sensor structure is made of a material that has a different stiffness than either transmitting conductor or the receiving conductor, or both. In an embodiment, the sensor structure comprises at least two portions, each having a different Young's modulus (E). In an embodiment, the sensor structure comprises two portions, a first portion supporting the transmitting conductors and a second portion supporting the receiving conductors. In an embodiment, separate portions of the sensor structure have a different rigidity or stiffness. In an embodiment, separate portions of the sensor structure have a different E value. In an embodiment, separate portions of the sensor structure can move in relation to each other.

Still referring to FIGS. 1 and 2, the transmitting conductors 11 and the receiving conductors 12 are located within the sensor structure 10. In FIGS. 1 and 2, the transmitting conductors 11 and receiving conductors 12 are shown paired and running parallel to each other. The pairs of transmitting conductors 11 and receiving conductors 12 extend around the circumference of the controller 20(a). In FIGS. 1 and 2, the lengthwise dimension of the transmitting conductor 11 and the receiving conductor 12 extends in the height-wise dimension of the controller 20(a). In the embodiment shown, the paired transmitting conductors 11 and receiving conductors 12 are spaced equidistantly from each other pair.

In an embodiment, the transmitting conductors 11 are not arranged in parallel to one another or to the receiving conductors 12. In an embodiment, the transmitting conductors 11 extend in a lengthwise direction perpendicular to the direction the receiving conductors 12 extend in a lengthwise direction. In an embodiment, the transmitting conductors 11 are arranged in a variety of directions with respect to one or more of the receiving conductors 12. In an embodiment, the transmitting conductors 11 may be arranged in a distribution that is random. In an embodiment, the transmitting conductors 11 are arranged in an ordered distribution. In an embodiment, the transmitting conductors 11 are arranged in a predetermined configuration. It should be understood that the orientation of the transmitting conductors 11 with respect the receiving conductors 12 may vary and many different configurations will be apparent to a person of skill in the art in view of this disclosure.

Still referring to FIGS. 1 and 2, the transmitting conductors 11 and the receiving conductors 12 are shown having cylindrical shapes. Each of the transmitting conductors 11 and receiving conductors 12 may have shapes other than a cylindrical shape and several transmitting conductors 11 and receiving conductors 12 may have shapes that differ from one-another within the same sensor structure 10.

In an embodiment, the conductors are formed as three-dimensional objects (or the faces of such three-dimensional objects, see, e.g. FIGS. 5 and 6 discussed below), examples of which include: cubes, rectangular prisms, triangular prisms, octagonal prisms, tetrahedrons, pyramids, square pyramids, hexagonal structures, dodecahedral structures and cones. In an embodiment, interleaving conductors and other conductors in two or more dimensions are possible. For example, 2 mm cubes could be placed, e.g., 2 mms apart in a two dimensional grid within a sensor structure that is, e.g. 1" wide and worn on the wrist, while another layer of similar cubes could be deployed within a sensor structure that is ½" wide, and which circumscribes the first array, but is affixed so that it generally covers only the center ½" of the second structure. In an embodiment, an array of e.g., alternating transmitting conductors and receiving conductors can be employed.

In FIG. 1, the transmitting conductors 11 function as transmitting antennas and the receiving conductors 12 function as receiving antennas. In FIGS. 1 and 2, transmitting conductors 11 and receiving conductors 12 are made of solid conductive material. The transmitting conductors 11 and the receiving conductors 12 are operably connected to the IC 100 via leads 101 and 102. As discussed above the roles of the transmitting conductors 11 and the receiving conductors 12 may switch or alternate if from frame to frame.

In an embodiment, receiving conductors 12 are made of a flexible conductive material and transmitting conductors 11 are made of a flexible conductive material. In an embodiment, the locations of the transmitting conductors 11 and the receiving conductors 12 vary. In an embodiment, the receiving conductors 12 are located within the sensor structure 10 at a location that has a stiffness different than the stiffness of the sensor structure 10 where the transmitting conductors 11 are located. In an embodiment, the locations within the sensor structure 10 that are of different stiffness may be within the same plane. In an embodiment, the locations within the sensor structure 10 may be at different layers within the sensor structure 10. "Stiffness," generally, is a property of the displacement produced by a force along the same degree of freedom, e.g., the change in length of stretched spring. In the international system of units this property is typically measured in newton per meter.

Still referring to FIGS. 1 and 2, the integrated circuit 100 is a mixed signal integrated circuit and is adapted to generate one or more signals and send the signals to the transmitting conductors 11 via leads 101. Receiving conductors 12 may receive signals and transmit the received signals via leads 102 to the integrated circuit 100. The IC 100 and leads 101 and 102 function as drive and sense circuitry to cause the transmitting conductors 11 and the receiving conductors 12 to form interacting pairs of conductors, and to measure and process the interactions between the interacting pairs of conductors during a plurality of integration periods.

In an embodiment, a mixed signal integrated circuit 100 is adapted to generate one or more signals and send the signals to at least one of the transmitting conductors 11 and the receiving conductors via leads 101. In an embodiment, the mixed signal integrated circuit 100 is adapted to generate a plurality of frequency-orthogonal signals and send the plurality of frequency-orthogonal signals, respectively, to a plurality of conductors selected from the plurality of the transmitting conductors 11.

In an exemplary wrist band embodiment, such as shown in FIGS. 1 and 2, information about hand and wrist motion can be ascertained by detecting changes in the signals measured that reflect movement within the volume surrounded by the sensor structure 10. In an embodiment, each transmitting conductor 11 can be used to transmit a plurality of frequency-orthogonal signals. In an embodiment, operation of the transmitting conductors 11 and receiving conductors 12 can be dynamically re-configured, allowing each of the transmitting conductors 11 and receiving conductors 12 to operate as either a transmitter or a receiver (or ground) during any integration period. In an embodiment, a transmitting conductor 11 (or receiving conductor 12) can be used as both a transmitter and a receiver (albeit of different frequency-orthogonal signals) during a single integration period. In an embodiment, two groups of transmitting conductors 11 (or receiving conductors 12) are used as both transmitters and receivers during the same integration period; the first group of transmitting conductors 11 (or receiving conductors 12) has its received signals passed through a high pass filter and are used to transmit only low frequencies, while the second group of transmitting conductors 11 (or receiving conductors 12) has its received signals passed through a low pass filter and transmit only high frequencies.

Using the mixed signal integrated circuit 100 described above, or another system that can transmit and receive signals, measurements are made corresponding to the changes in the electrical interaction of interacting pairs of conductors. These measurements are then used to derive information about interior motion that occurs within the circumference and volume of the controller 20(a) shown in FIGS. 1 and 2. As the wrist articulates within the controller 20(a) movements within the wrist interact with and cause alterations in the field generated by the signals transmitted from the transmitting conductors 11 and received by the receiving conductors 12. Each frame of received signals is processed by the integrated circuit 100 and used to determine alterations in the field. The alterations are then compared to predetermined values for the field in order to correlate the alterations with interior motions. The predetermined values for the field can be ascertained via machine learning algorithms. Additionally, machine learning can be implemented to refine the accuracy of the detected movements within the interior volume of space.

In an embodiment, multiple frames of received signals may be received and statistically modified in order to reduce noise when analyzing the received signals. For example, multiple frames of signals may be received and averaged in order to produce a clearer image of the interior motion. Further accuracy and refinement of interior movement may be ascertained by the various measurements made from different regions of the sensor structure 10.

In an embodiment, the signal measurements (which can be magnitude and/or phase) are used to determine an interior motion and infer a position or motion of a body part such as the articulation of the bones, joints, tendons and muscles. In an embodiment, signal measurements are used to determine a position or motion of a body part such as the articulation of the bones, joints and muscles of the wrist area. In an embodiment, signal measurements are used to determine the position and/or movement of a hand, wrist, foot, ankle, head, neck, torso, arm, shoulder, or any other body part, or a portion of a body part. In an embodiment, signal measurements are used to determine elastic movement of skin in relation to a body or body part. In an embodiment, signal measurements can be used to determine the vibration and movement of vocal cords. In an embodiment, signal measurements are used to deduce sounds or speech from the vibration and movement of vocal cords. In an embodiment, signal measurements are used to determine respiration, heart activity, pulse or other biomechanical changes. In an embodiment, signal measurements are used to determine the magnitude of hand motion. In an embodiment, the change in signal is used to determine a direction of the hand motion. In an embodiment, the signal measurements are used in combination with a constrained model of the hand and skin to determine the motion of the hand. In an embodiment, signal measurements are used in combination with a constrained model of the hand and skin to translate the motion into an VR/AR system.

In an embodiment, the transmitting conductors 11 and receiving conductors 12 may be part of a conductor array including one or more transmitting conductors 11 and one or more receiving conductors 12. In an embodiment, more conductors will lead to a better measurement of the movements reflected by interior motion. The placement of conductors and the nature of the conductors so that they establish as a result of the body movement that is desired to be measured, and not quantity alone, will lead to improved capability for measurement. In an embodiment, conductors are placed in key locations on or proximate to a body part so that movement of the body part within the generated field can be used to determine information regarding the body part. By "proximate" it is generally meant close enough that the conductors are able to provide information regarding the movement of the body part, for example on the wrist area to provide information regarding a hand posture or position. In an embodiment, conductors of an array are placed at specific locations on the wrist area where articulation can be determined.

In an embodiment, machine learning algorithms are used to associate movement with consequential signal changes, and then to model movement based on such consequential signal changes. In an embodiment, (1) a controller comprising the conductors is positioned for use; (2) a plurality of measurements are taken via the conductors and simultaneously via a relative ground truth means such as by a camera; (3) a machine learning algorithm is used to associate the measurements with alterations in the field; and (4) later events are inferred based upon measurements. For example, a controller comprising conductors may be worn as a wristband; in view of one or more cameras to operate as ground truth, the hand is placed in a series of poses; a machine learning algorithm then uses the captured sensor and camera data to associate hand poses or movements with sensor readings; and finally, hand poses are inferred based on sensor readings.

Figure 3:
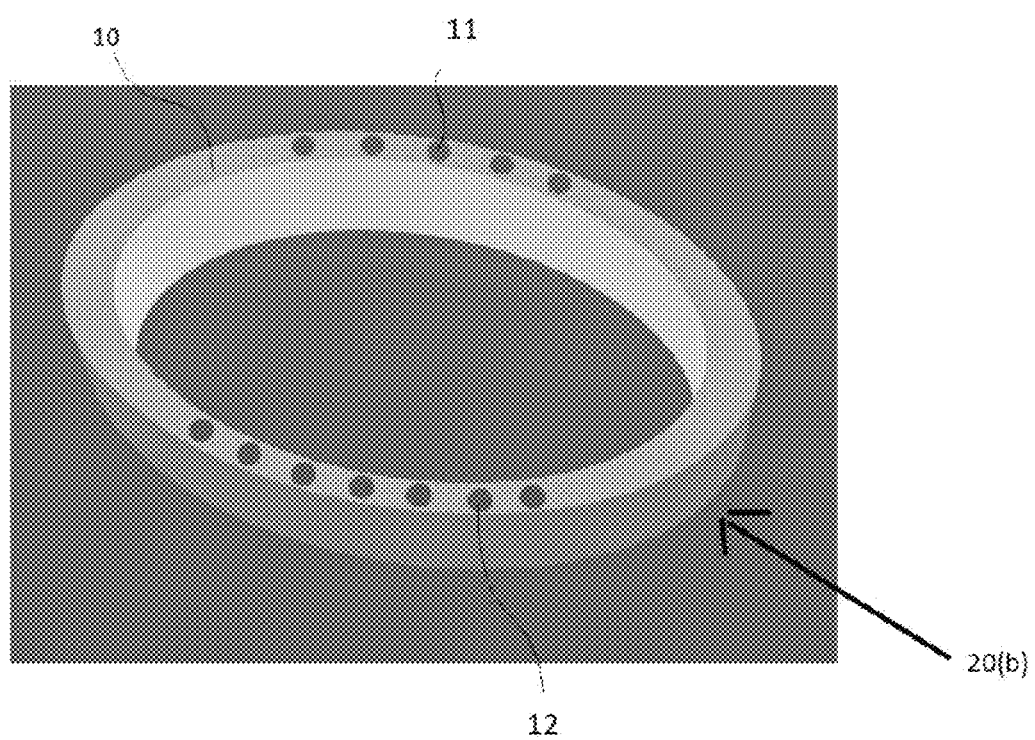
FIG. 3 shows another schematic view of a controller for detecting interior motion.
Figure 4:
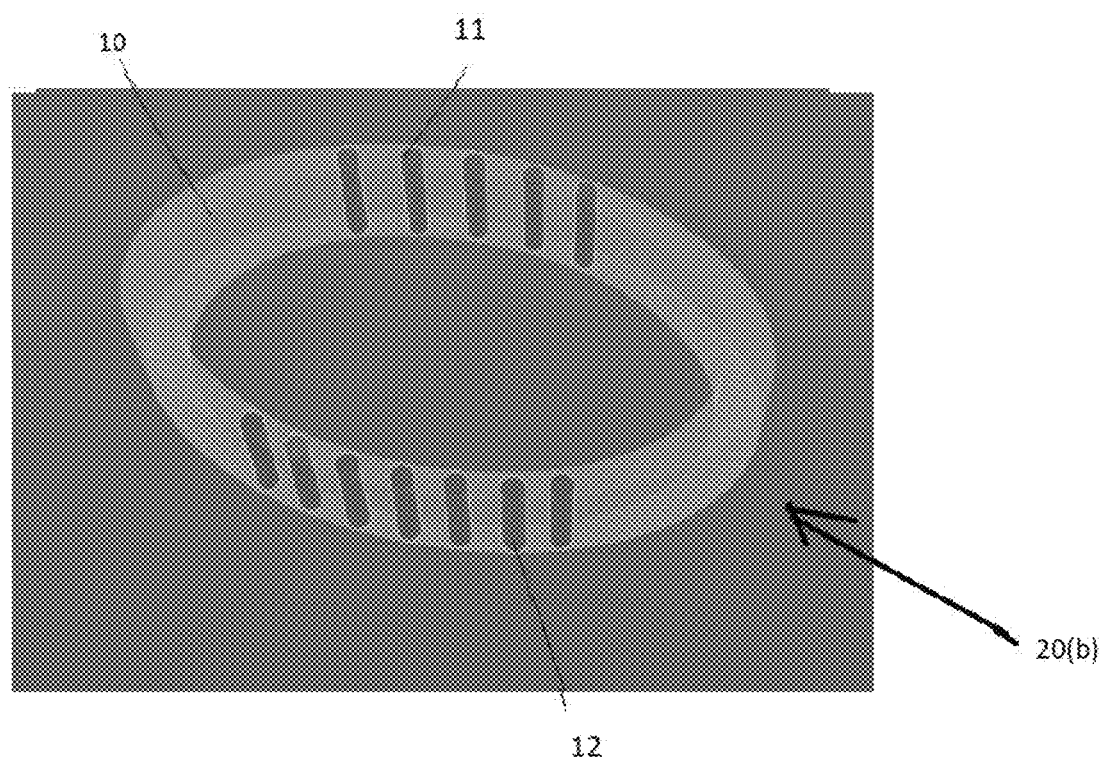
FIG. 4 shows another schematic view of the controller for detecting interior motion shown in FIG. 3.

Turning to FIGS. 3 and 4, shown are transmitting conductors 11 clustered together on one side of the perimeter of the controller 20(b). Receiving conductors 12 are located and clustered together on the other side of the perimeter of the controller 20(b). As discussed above, the orientation of the transmitting conductors 11 with respect the receiving conductors 12 may vary and many different configurations will be apparent to a person of skill in the art in view of this disclosure. Likewise, the transmitting and receiving (and ground) roles of the transmitting conductor 11 and the receiving conductors 12 may alternate or be reversed.

In an embodiment, interior motion is inferred by signal measurements reflecting the electrical interaction between the transmitting conductors 11 and receiving conductors 12. In an embodiment, the measurements are used to model and determine movement, position and/or other characteristics of body parts. In an embodiment, the measurements are used to model and determine movement, position and/or other characteristics of objects in which the sensors are located.

Figure 5:
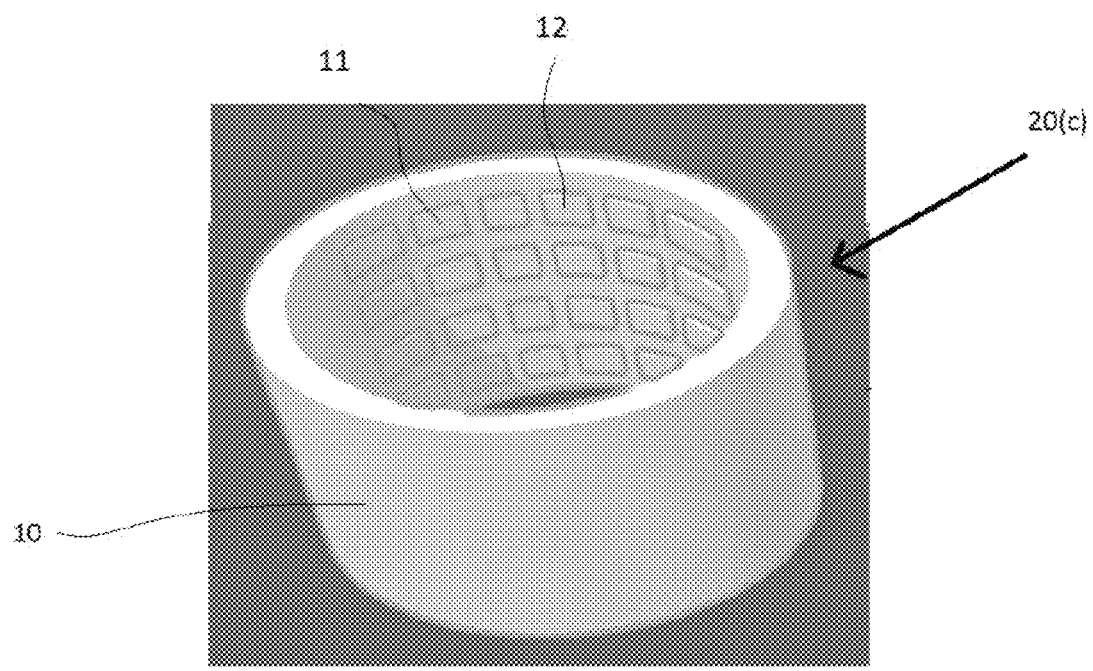
FIG. 5 shows a schematic view of a controller for detecting interior motion.
Figure 6:
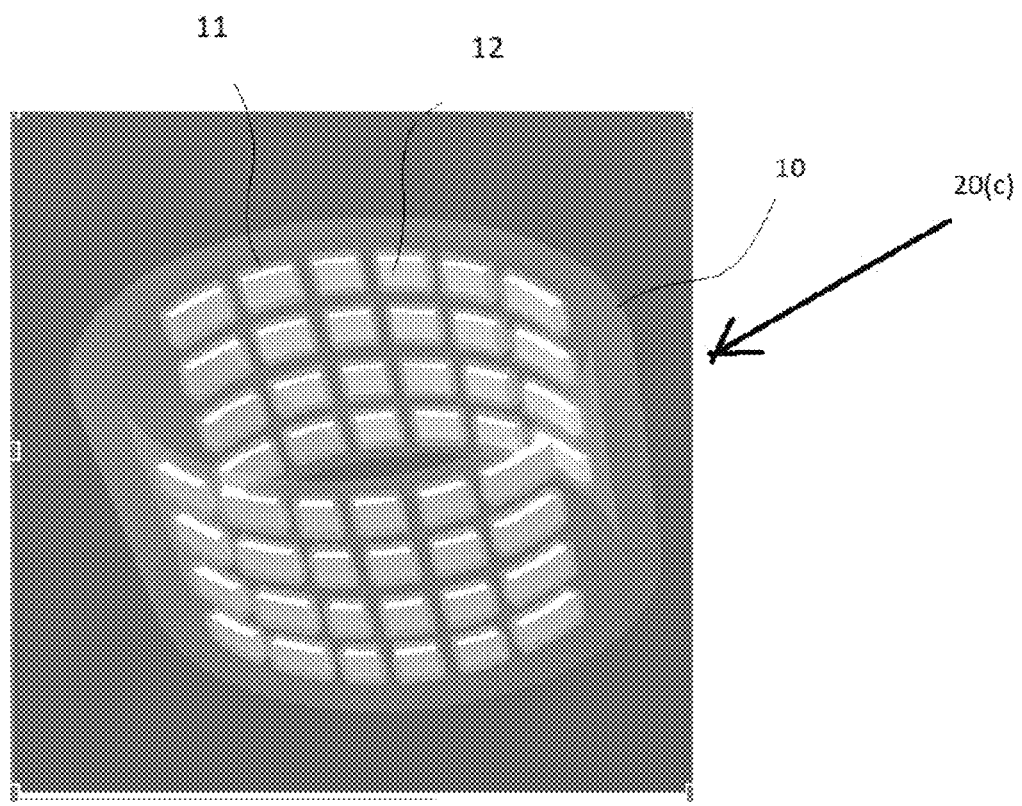
FIG. 6 shows another schematic view of the controller for detecting interior motion shown in FIG. 5.

Turning to FIGS. 5 and 6, controller 20(c) is shown having a plurality of transmitting conductors 11 and receiving conductors 12 arranged as an array of square shaped antennas within the sensor structure 10. The transmitting conductors 11 and the receiving conductors 12 are shown clustered at opposite sides of the controller 20(c). In an embodiment, the array of transmitting conductors 11 and receiving conductors 12 extends around the entire inner circumference of the controller 20(c). As discussed above, the orientation of the transmitting conductors 11 with respect to the receiving conductors 12 may vary and many different configurations will be apparent to a person of skill in the art in view of this disclosure. Likewise, the transmitting and receiving roles of the transmitting conductors 11 and the receiving conductors 12 may alternate or be reversed.

Still referring to FIGS. 5 and 6, antennas often have static characteristics. For example, they have fixed surfaces areas and identities (i.e. transmitter, receiver, ground). However, it is possible to vary these characteristics in real-time to dynamically adjust the behavior of a sensor design.

In addition to surface area, the behavior of each antenna can be changed in real-time to programmatically alter sensor design. Given a matrix of N×M antenna (such as illustrated in FIGS. 5 and 6), each with a square geometry of 5×5 mm, the behavior of each conductor/antenna can be dynamically designated as a transmitter or receiver. Similarly, some conductors/antennas can be grounded to reduce the response of nearby receivers.

Beyond identity, surface area of the sensor can be programmed as well. For example capacitance will increase as the surface area of a capacitor plate increases. Given a matrix of square antennas/conductors, e.g., each with a surface of 5×5 mm, and a set of physical switches between each antenna, it is possible to dynamically change an antenna's surface area. Combinations of these square conductors/antennas can be connected using their switches. For example, a group of two conductors/antenna can be connected to produce a surface area of 50 mm$^2$ (i.e. 5×10 mm), a group of four can be connected to form a 100 mm$^2$ area (i.e. 10×10 mm), and so on. Of course, the 5×5 size is just illustrative, and this principle would be equally applicable to smaller and larger arrays of antennas/conductors.

Figure 7:
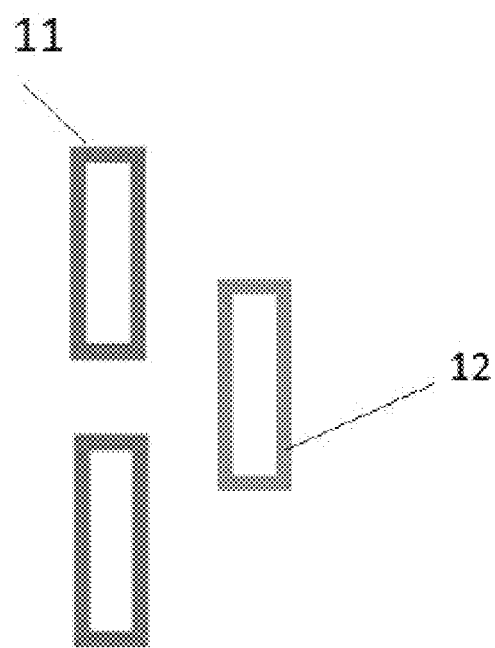
FIG. 7 shows a diagram of an arrangement of conductors arranged in a linear pattern.

FIG. 7 shows a schematic high-level diagram of an embodiment where conductors are arranged in linear patterns. The conductors are offset from each other so that two of the transmitting conductors 11 extend over the receiving conductors 12 and vice-versa. These transmitting conductors 11 and receiving conductors 12 can extend around the circumference of a controller. The transmitting conductors 11 and receiving conductors 12 transmit and receive signals. Motion within the field generated by the transmitting conductors 11 and the receiving conductors 12 will cause alterations to the field. Measurements in the alterations in the field (magnitude and/or phase) permit determination of the interior motion. Measurements of the interior motion are able to be used to infer body motion.

Figure 8:
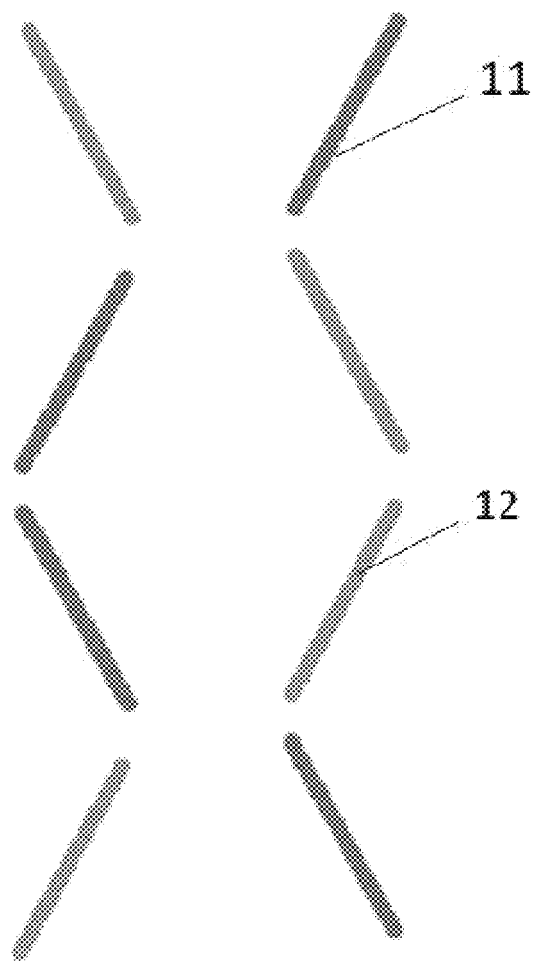
FIG. 8 shows a diagram of an arrangement of conductors arranged in an opposing saw-tooth pattern.

FIG. 8 shows a schematic high-level diagram of an embodiment where conductors are arranged in an opposing saw-tooth pattern. The transmitting conductors 11 are angled in opposite directions from the angling of the receiving conductors 12. These transmitting conductors 11 and receiving conductors 12 can extend around the circumference of a controller. The transmitting conductors 11 and receiving conductors 12 transmit and receive signals. Motion within the field generated by the transmitting conductors 11 and the receiving conductors 12 will cause alterations to the field. Measurements in the alterations in the field (magnitude and/or phase) permit determination of the interior motion. Measurements of the interior motion are able to be used to infer body motion.

Figure 9:
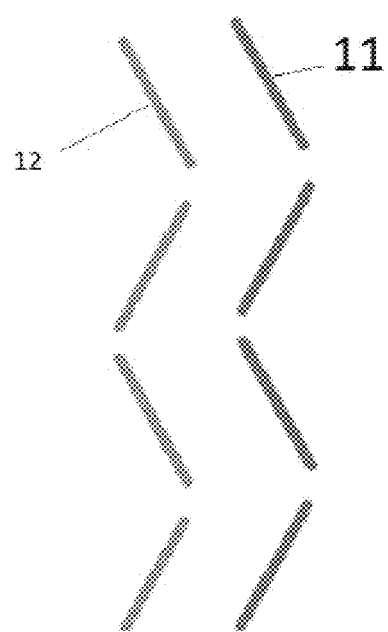
FIG. 9 shows a diagram of an arrangement of conductors arranged in complementary saw-tooth pattern.

FIG. 9 shows a schematic high-level diagram of an embodiment where conductors are arranged in complementary saw-tooth pattern. The transmitting conductors 11 are angled in the same direction as the angling of the receiving conductors 12. These transmitting conductors 11 and receiving conductors 12 can extend around the circumference of a controller. The transmitting conductors 11 and receiving conductors 12 transmit and receive signals. Motion within the field generated by the transmitting conductors 11 and the receiving conductors 12 will cause alterations to the field. Measurements in the alterations in the field (magnitude and phase) permit determination of the interior motion. Measurements of the interior motion are able to be used to infer body motion.

Figure 10:
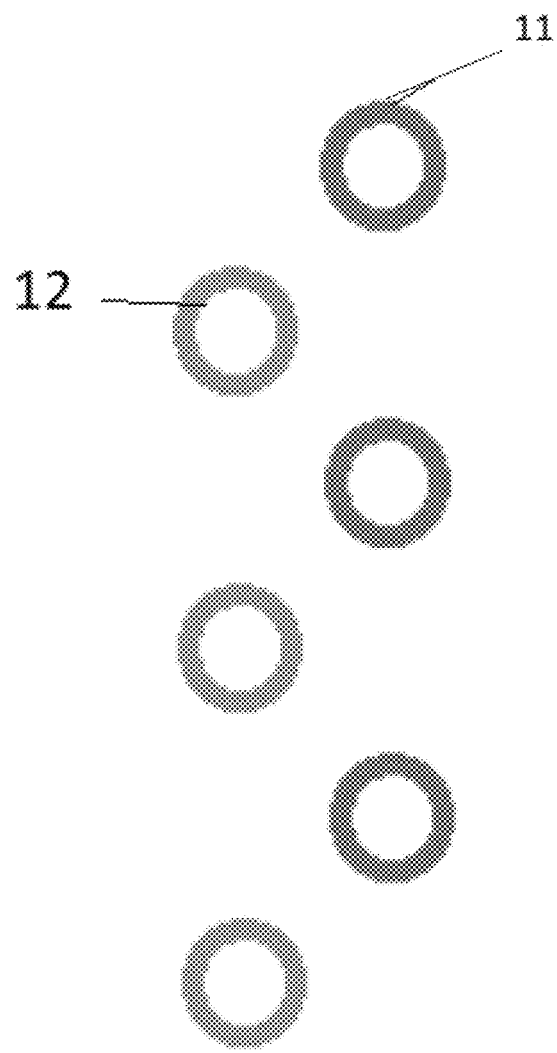
FIG. 10 shows a diagram of an arrangement of conductors arranged in a pattern where the ends of the conductors are extending out of the page.

FIG. 10 shows a schematic high-level diagram of an embodiment where cylindrical conductors are arranged in an alternating pattern. In addition to this orientation it is possible to orient conductors in a variety of orientations with respect to the surface of a band or other wearable. These transmitting conductors 11 and receiving conductors 12 can extend around the circumference of a controller. The transmitting conductors 11 and receiving conductors 12 transmit and receive signals. Motion within the field generated by the transmitting conductors 11 and the receiving conductors 12 will cause alterations to the field. Measurements in the alterations in the field (magnitude and phase) permit determination of the interior motion. Measurements of the interior motion are able to be used to infer body motion.

Figure 11:
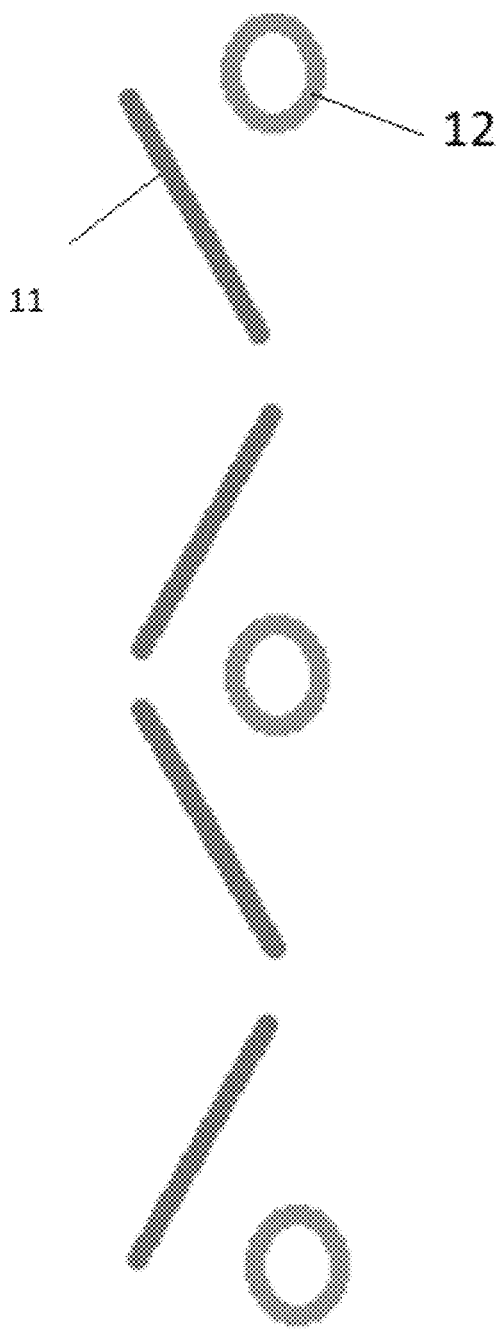
FIG. 11 shows a diagram of an arrangement of conductors where the conductors are arranged in a saw-tooth pattern and the conductors are extending out of the page.

FIG. 11 shows a schematic high-level diagram of an embodiment where non-homogenous conductors are arranged in proximity to each other. These transmitting conductors 11 and receiving conductors 12 can extend around the circumference of a controller. The transmitting conductors 11 and receiving conductors 12 transmit and receive signals. Motion within the field generated by the transmitting conductors 11 and the receiving conductors 12 will cause alterations to the field. Measurements in the alterations in the field (magnitude and phase) permit determination of the interior motion. Measurements of the interior motion are able to be used to infer body motion.

In an embodiment, very small transmitting and receiving conductors are positioned directly on a variety of nearby locations (on the body or on the sensing object), and can detect interior motion due to motion within the field generated by the conductors. The interior motion can be used to infer movement or positions of nearby body parts or forces.

An embodiment of the disclosure is an apparatus comprising a transmitting conductor adapted to transmit signals; a receiving conductor adapted to receive signals transmitted by the transmitting conductor; the transmitting conductor and the receiving conductor operatively coupled to drive and sense circuitry, the drive and sense circuitry being adapted to cause the transmitting conductor and the receiving conductor to form an interacting pair of conductors, and to measure the interactions between the interacting pair of conductors during a plurality of integration periods; and wherein the drive and sense circuitry determines interior motion within a volume of space proximate to the transmitting conductor and the receiving conductor based upon the measured interactions during a plurality of integration periods.

Another embodiment of the disclosure is a method comprising the steps of generating a plurality of frequency-orthogonal signals on each of a plurality of transmitting conductors, respectively; receiving signals on a plurality of receiving conductors, the plurality of receiving conductors being oriented such that each of the plurality of transmitting conductors forms an interacting pair of conductors with at least one of the plurality of receiving conductors; processing the received signals received during an integration period to determine a measurement corresponding to each of the plurality of frequency-orthogonal signals for each of the received signals; and determining an interior motion based upon the measurements during a plurality of integration periods.

It is understood that the programs and processes discussed herein may be implemented by means of analog or digital hardware and computer program instructions. Computer program instructions may be provided to a processor of a general purpose computer, special purpose computer, ASIC, or other programmable data processing apparatus, such that the instructions, which execute via a processor of a computer or other programmable data processing apparatus, implements the functions/acts specified in the block diagrams or operational block or blocks.

Many different configurations will be apparent to a person of skill in the art in view of this disclosure. While the invention has been particularly shown and described with reference to embodiments thereof, it will be understood by those skilled in the art that various changes in form and details may be made therein without departing from the spirit and scope of the invention.

The invention claimed is:

1. An apparatus comprising:
a wristband shaped to surround a volume of a wrist of a user, the wristband comprising:
one or more transmitting conductors adapted to transmit signals; and
one or more receiving conductors adapted to receive signals transmitted by the one or more transmitting conductors; and
drive and sense circuitry being adapted to:
dynamically adjust, before or during each of a plurality of sampling periods and while the wristband is secured to the wrist of the user, at least one user-interfacing characteristic of at least one of:
the one or more transmitting conductors; or
the one or more receiving conductors;
transmit, during each of the plurality of sampling periods, a signal from the one or more transmitting conductors;
measure, during each of the plurality of sampling periods, the signal at the one or more receiving conductors; and
determine, based upon signals measured during the plurality of sampling periods, an interior motion of one or more body parts within the volume surrounded by the wristbands.

2. The apparatus of claim 1, wherein the interior motion of the one or more body parts determined by the drive and sense circuitry is at least one of:
a movement of a bone located within the volume of the wrist of the user;
a movement of a muscle located within the volume of the wrist of the user;
a movement of a tendon located within the volume of the wrist of the user; or
a movement of a ligament located within the volume of the wrist of the user.

3. The apparatus of claim 1, wherein:
the wristband comprises a curved inner surface for interfacing with skin of the wrist of the user;
the one or more transmitting conductors are oriented along the curved surface of the wristband;
the user-interfacing characteristic comprises a surface area of the one or more transmitting conductors interfacing with the skin of the wrist of the user; and
the drive and sense circuitry is adapted to dynamically adjust the user-interfacing characteristic by dynamically adjusting, while the wristband is secured to the wrist of the user, a size of the surface area of the one or more transmitting conductors interfacing with the skin of the wrist of the user.

4. The apparatus of claim 1, wherein:
the wristband comprises a curved inner surface for interfacing with skin of the wrist of the user;
the one or more receiving conductors are oriented along the curved surface of the wristband;
the user-interfacing characteristic comprises a surface area of the one or more receiving conductors interfacing with the skin of the wrist of the user; and
the drive and sense circuitry is adapted to dynamically adjust the user-interfacing characteristic by dynamically adjusting, while the wristband is secured to the wrist of the user, a size of the surface area of the one or more receiving conductors interfacing with the skin of the wrist of the user.

5. The apparatus of claim 1, wherein:
the wristband comprises a curved inner surface for interfacing with skin of the wrist of the user;
the one or more transmitting conductors are oriented along the curved surface of the wristband;
the user-interfacing characteristic comprises a combined shape of the one or more transmitting conductors interfacing with the skin of the wrist of the user; and
the drive and sense circuitry is adapted to dynamically adjust the user-interfacing characteristic by dynamically adjusting, while the wristband is secured to the wrist of the user, the combined shape of the one or more transmitting conductors interfacing with the skin of the wrist of the user.

6. The apparatus of claim 1, wherein:
the wristband comprises a curved inner surface for interfacing with skin of the wrist of the user;
the one or more receiving conductors are oriented along the curved surface of the wristband;
the user-interfacing characteristic comprises a combined shape of the one or more receiving conductors interfacing with the skin of the wrist of the user; and
the drive and sense circuitry is adapted to dynamically adjust the user-interfacing characteristic by dynamically adjusting, while the wristband is secured to the wrist of the user, the combined shape of the one or more receiving conductors interfacing with the skin of the wrist of the user.

7. The apparatus of claim 1, wherein:
the one or more transmitting conductors are oriented in a first row substantially aligned to a circumference of a first substantially cylindric section of the wristband;
the one or more receiving conductors are oriented in a second row substantially aligned to a circumference of a second substantially cylindric section of the wristband, wherein the first substantially cylindric section and the second substantially cylindric section are substantially parallel; and
the one or more transmitting conductors are offset from the one or more receiving conductors.

8. The apparatus of claim 1, wherein:
the one or more transmitting conductors are oriented in a saw-tooth pattern substantially aligned to a circumference of a first substantially cylindric section of the wristband; and
the one or more receiving conductors are oriented in an opposing saw-tooth pattern substantially aligned to a circumference of a second substantially cylindric section of the wristband, wherein the first substantially cylindric section and the second substantially cylindric section are substantially parallel.

9. The apparatus of claim 1, wherein:
the one or more transmitting conductors are oriented in a saw-tooth pattern substantially aligned to a circumference of a first substantially cylindric section of the wristband; and
the one or more receiving conductors are oriented in a matching saw-tooth pattern substantially aligned to a circumference of a second substantially cylindric section of the wristband, wherein the first substantially cylindric section and the second substantially cylindric section are substantially parallel.

10. The apparatus of claim 1, wherein a matching shape of each of the one or more transmitting conductors is different from a matching shape of the one or more receiving conductors.

11. A method comprising:
dynamically adjusting, before or during each of a plurality of sampling periods and while a wristband shaped to surround a volume of a wrist of a user is secured to the wrist of the user, at least one user-interfacing characteristic of at least one of:
one or more transmitting conductors integrated into the wristband; or
one or more receiving conductors integrated into the wristband;
during each of the plurality of sampling periods:
transmitting a signal from the one or more transmitting conductors; and
receiving the signal at the one or more receiving conductors; and
determining, based upon signals received during the plurality of sampling periods, an interior motion of one or more body parts within the volume surrounded by the wristband.

12. The method of claim 11, wherein:
the wristband comprises a curved inner surface for interfacing with skin of the wrist of the user;
the one or more transmitting conductors are oriented along the curved surface of the wristband;
the user-interfacing characteristic comprises a surface area of the one or more transmitting conductors interfacing with the skin of the wrist of the user; and
dynamically adjusting the user-interfacing characteristic comprises dynamically adjusting, while the wristband is secured to the wrist of the user, the surface area of the one or more transmitting conductors interfacing with the skin of the wrist of the user.

13. The method of claim 11, wherein:
the wristband comprises a curved inner surface for interfacing with skin of the wrist of the user;
the one or more receiving conductors are oriented along the curved surface of the wristband;
the user-interfacing characteristic comprises a surface area of the one or more receiving conductors interfacing with the skin of the wrist of the user; and
dynamically adjusting the user-interfacing characteristic comprises dynamically adjusting, while the wristband is secured to the wrist of the user, the surface area of the one or more receiving conductors interfacing with the skin of the wrist of the user.

14. The method of claim 11, wherein:
the wristband comprises a curved inner surface for interfacing with skin of the wrist of the user;
the one or more transmitting conductors are oriented along the curved surface of the wristband;

the user-interfacing characteristic comprises a shape of the one or more transmitting conductors interfacing with the skin of the wrist of the user; and dynamically adjusting the user-interfacing characteristic comprises dynamically adjusting, while the wristband is secured to the wrist of the user, the shape of the one or more transmitting conductors interfacing with the skin of the wrist of the user.

15. The method of claim 11, wherein:

the wristband comprises a curved inner surface for interfacing with skin of the wrist of the user;

the one or more receiving conductors are oriented along the curved surface of the wristband;

the user-interfacing characteristic comprises a shape of the one or more receiving conductors interfacing with the skin of the wrist of the user; and dynamically adjusting the user-interfacing characteristic comprises dynamically adjusting, while the wristband is secured to the wrist of the user, the shape of the one or more receiving conductors interfacing with the skin of the wrist of the user.

16. The method of claim 11, wherein:

the wristband comprises a curved inner surface for interfacing with skin of the wrist of the user;

the one or more transmitting conductors are oriented along the curved surface of the wristband;

the user-interfacing characteristic comprises a number of the one or more transmitting conductors used for transmitting the signal; and dynamically adjusting the user-interfacing characteristic comprises dynamically adjusting, while the wristband is secured to the wrist of the user, the number of the one or more transmitting conductors used for transmitting the signal.

17. The method of claim 11, wherein:

the wristband comprises a curved inner surface for interfacing with skin of the wrist of the user;

the one or more receiving conductors are oriented along the curved surface of the wristband;

the user-interfacing characteristic comprises a number of the one or more receiving conductors used for receiving the signal; and dynamically adjusting the user-interfacing characteristic comprises dynamically adjusting, while the wristband is secured to the wrist of the user, the number of the one or more receiving conductors used for receiving the signal.

18. The method of claim 11, wherein:

the wristband comprises a curved inner surface for interfacing with skin of the wrist of the user;

the one or more transmitting conductors are oriented along the curved surface of the wristband;

the user-interfacing characteristic comprises a length of the one or more transmitting conductors interfacing with the skin of the wrist of the user; and dynamically adjusting the user-interfacing characteristic comprises dynamically adjusting, while the wristband is secured to the wrist of the user, the length of the one or more transmitting conductors interfacing with the skin of the wrist of the user.

19. The method of claim 11, wherein:

the wristband comprises a curved inner surface for interfacing with skin of the wrist of the user;

the one or more receiving conductors are oriented along the curved surface of the wristband;

the user-interfacing characteristic comprises a length of the one or more receiving conductors interfacing with the skin of the wrist of the user; and dynamically adjusting the user-interfacing characteristic comprises dynamically adjusting, while the wristband is secured to the wrist of the user, the length of the one or more receiving conductors interfacing with the skin of the wrist of the user.

20. The method of claim 11, wherein:

the wristband comprises a curved inner surface for interfacing with skin of the wrist of the user;

the one or more transmitting conductors and the one or more receiving conductors are oriented along the curved surface of the wristband; and dynamically adjusting the user-interfacing characteristic comprises dynamically adjusting, while the wristband is secured to the wrist of the user, how the one or more transmitting conductors used for transmitting the signal are oriented relative to the one or more receiving conductors used for receiving the signal.

\* \* \* \* \*